US012663566B2

(12) United States Patent
Wang et al.

(10) Patent No.: US 12,663,566 B2
(45) Date of Patent: Jun. 23, 2026

(54) OPTICAL RELAY SYSTEM

(71) Applicant: Living Optics Limited, Oxford (GB)

(72) Inventors: Robin Wang, Oxford (GB); Stephen Chappell, Oxford (GB); Samuel Martyn Hornett, Oxford (GB); John D Griffith, Rochester, NY (US)

(73) Assignee: LIVING OPTICS LIMITED, Oxford (GB)

( * ) Notice: Subject to any disclaimer, the term of this patent is extended or adjusted under 35 U.S.C. 154(b) by 265 days.

(21) Appl. No.: 18/265,628

(22) PCT Filed: Dec. 10, 2021

(86) PCT No.: PCT/EP2021/085248
§ 371 (c)(1),
(2) Date: Jun. 6, 2023

(87) PCT Pub. No.: WO2022/123035
PCT Pub. Date: Jun. 16, 2022

(65) Prior Publication Data
US 2024/0027736 A1 Jan. 25, 2024

Related U.S. Application Data

(63) Continuation of application No. 17/118,900, filed on Dec. 11, 2020, now Pat. No. 12,124,015.

(51) Int. Cl.
| | |
|---|---|
| G02B 5/04 | (2006.01) |
| G02B 9/10 | (2006.01) |
(Continued)

(52) U.S. Cl.
CPC .................. G02B 5/04 (2013.01); G02B 9/10 (2013.01); G02B 13/0055 (2013.01);
(Continued)

(58) Field of Classification Search
None
See application file for complete search history.

(56) References Cited

U.S. PATENT DOCUMENTS

| | | |
|---|---|---|
| 5,888,193 A | 3/1999 | Breidenthal et al. |
| 8,994,939 B2 | 3/2015 | Herrala |
(Continued)

OTHER PUBLICATIONS

Fernandez "Fluorescence microscopy with a coded aperture snapshot spectral imager", Proceedings of SPIE, vol. 7184, Feb. 12, 2009 (Feb. 12, 2009), p. 71840Z, XP055376006, US DOI: 10.1117/12.807863, ISBN: 978-1-51 06-1533-5 (Year: 2009).*
(Continued)

*Primary Examiner* — Stephone B Allen
*Assistant Examiner* — Tamara Y. Washington
(74) *Attorney, Agent, or Firm* — 24IPUSA Law Group USA, PLLC; Timothy R DeWitt

(57) ABSTRACT

A spectrally shearing optical relay system, said relay system being comprised of two halves disposed symmetrically about an aperture stop S, wherein each half comprises a plurality of rotationally symmetric optical elements forming an objective and a com-pound prism comprised of a plurality of dispersing prisms. The compound prisms are located between the objectives and the aperture stop. An imaging device with such an optical relay system is also proposed.

14 Claims, 8 Drawing Sheets

(51) Int. Cl.

| | | |
|---|---|---|
| *G02B 13/00* | (2006.01) | |
| *G02B 13/22* | (2006.01) | |
| *G02B 27/00* | (2006.01) | |

(52) U.S. Cl.

CPC ......... *G02B 13/0095* (2013.01); *G02B 13/22* (2013.01); *G02B 27/0025* (2013.01); *G02B 27/0062* (2013.01)

(56) References Cited

U.S. PATENT DOCUMENTS

| | | | | |
|---|---|---|---|---|
| 2006/0269215 A1 | 11/2006 | Lundgren | | |
| 2007/0027017 A1* | 2/2007 | Hachitani | ............... | C03C 3/068 |
| | | | | 65/102 |
| 2015/0080982 A1* | 3/2015 | Van Funderburk | .......................... | |
| | | | | A61N 1/37247 |
| | | | | 607/59 |
| 2020/0223009 A1* | 7/2020 | Brooks | .............. | G02B 27/0031 |
| 2021/0310938 A1 | 10/2021 | Körner et al. | | |

OTHER PUBLICATIONS

David S. Kittle: "Design and fabrication of an ultraviolet-visible coded aperture snapshot spectral imager", Optical Engineering, vol. 51, No. 7, May 14, 2012 (May 14, 2012), p. 071403.

Robert T. Kester et al: "Real-time snapshot hyperspectral imaging endoscope", Journal of Biomedical Optics, vol. 16, No. 5, Jan. 1, 2011 (Jan. 1, 2011), p. 056005.

Ashwin A Wagadarikar, Nikos P Pitsianis, Xiaobai Sun, and David J Brady, "Video rate spectral imaging using a coded aperture snapshot spectral imager," Optics express, 17(8):6368-6388, 2009.

Hagen and Tkaczyk, "Compound prism design principles, I:" Applied Optics, 50, 24, 4998-5011; "Compound prism design principles, II: triplet and Janssen prisms," Applied Optics, 50, 24, 5012-5022 , 2011.

Hagen and Tkaczyk, "Compound prism design principles, III: linear-in-wavenumber and optical coherence tomography prisms," Applied Optics, 50, 25, 55023-5030, 2012.

Christy A. Fernandez et al: "Fluorescence microscopy with a coded aperture snapshot spectral imager", Proceedings of SPIE, vol. 7184, Feb. 12, 2009 (Feb. 12, 2009), p. 71840Z.

Xie Peiyue et al: "Light flow model of coded aperture snapshot spectral imager", Proceedings of SPIE, IEEE, US, vol. 9298, Nov. 18, 2014 (Nov. 18, 2014), pp. 92980C-92980C.

Mengjia Ding et al:"Design of a Tunable Snapshot Multispectral Imaging System through Ray Tracing Simulation", Journal of Imaging, vol. 5, No. 1, Jan. 5, 2019 (Jan. 5, 2019) , p. 9.

Hagen and Tkaczyk, "Compound prism design principles, II: triplet and Janssen prisms," Applied Optics, 50, 24, 5012-5022, 2011.

Wagadarikar, John, Willet, and Brady, "Single disperser design for coded aperture snapshot", Applied Optics, 47, 10, B44-B51 (2008).

Kittle, Cho, Wagadarikar, and Brady, "Multiframe image estimation for coded aperture snapshot spectral imagers", Applied Optics, 49, 36, 6824-6833 (2010).

Kester, Bedard, Gao, Tkacyzk, "Real-time snapshot hyperspectral imaging endoscope", Journal of Biomedical Optics, 16, 5, 056005-1-12 (2011).

Arce, Brady, Carin, Arguello, Kittle, "Compressive Coded Aperture Spectral Imaging" , IEEE Signal Processing Magazine, 105-115 (2014).

BD Imaging Spectroscopy for Measuring Hyperspectral Patterns on Solid Objects (To appear in the ACM SIGGRAPH conference proceedings; Min H. Kim et al.), 2012.

Hyperspectral prism-grating-prism imaging spectrograph (Mauri Aikio, VTT Publications 435) , 2001.

* cited by examiner

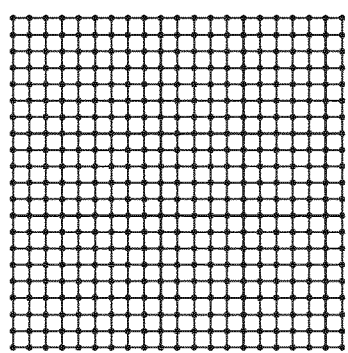

CV 1200e obj + 3j48627 prism
10/27/2020
Field: 4.92 w 4.92 h Millimeters
Image: 4.92 w 4.92 h Millimeters
Maximum distortion: -0.6371% SMIA TV distortion: -0.0232%
Scale: 1.000X, Wavelength: 0.4000 μm

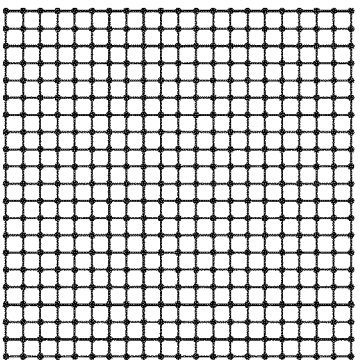

CV 1200e obj + 3j48627 prism
10/27/2020
Field: 4.92 w 4.92 h Millimeters
Image: 4.92 w 4.92 h Millimeters
Maximum distortion: -0.0083% SMIA TV distortion: 0.0001%
Scale: 1.000X, Wavelength: 0.7000 μm

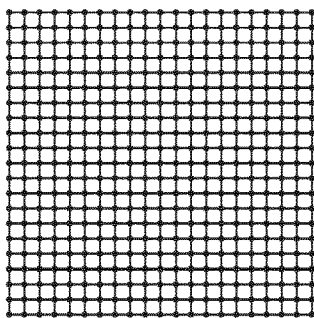

CV 1200e obj + 3j48627 prism
10/27/2020
Field: 4.92 w 4.92 h Millimeters
Image: 4.92 w 4.92 h Millimeters
Maximum distortion: -0.1359% SMIA TV distortion: -0.0017%
Scale: 1.000X, Wavelength: 1.0000 μm

Fig. 6

OPTICAL RELAY SYSTEM

BACKGROUND OF THE INVENTION

Field of the Invention

This application claims priority of US Patent Application number U.S. Ser. No. 17/118,900, filed on 11 Dec. 2020. The entire disclosure of the US Patent Application number U.S. Ser. No. 17/118,900 is hereby incorporated herein by reference The present invention relates to an optical relay system.

BRIEF DESCRIPTION OF THE RELATED ART

Coded aperture snapshot spectral imager (CASSI) is a computational imaging system that acquires a three-dimensional (3D) spectral data cube by single or a few two-dimensional (2D) measurements.

A typical overall optical architecture comprises an imaging lens which images a scene onto a mask, a relay optical system comprising a dispersive element which relays the masked image through a dispersive element, and a sensor to detect the masked and sheared image. The original data cube is algorithmically reconstructed from the sensor input.

The use of relay lenses and dispersing prisms in CASSI instruments is well known. The dispersive element may be a compound prism. The 'pixels' on the mask are matched to the pixels (or a 2×2 bin) of the sensor. Using a regular prism would result in undesirable optical effects such as anamorphic distortion and lateral chromatic aberrations that decrease image sharpness, leading to a more difficult and non-linear reconstruction.

Conventional relay systems used in spectroscopy are well corrected for the relaying of slit-shaped signals. However, little information can be found for the relaying and dispersing qualities of square (image) shaped signals, particular for the corners of a relayed imaged.

In the referenced paper, Ashwin A Wagadarikar, Nikos P Pitsianis, Xiaobai Sun, and David J Brady, "Video rate spectral imaging using a coded aperture snapshot spectral imager," Optics express, 17(8):6368-6388, 2009, Schott N-SK2 and N-SK4 glasses are used.

In a series of papers by Hagen and Tkaczyk entitled "Compound prism design principles, I," Applied Optics, 50, 24, 4998-5011; "Compound prism design principles, II: triplet and Janssen prisms," Applied Optics, 50, 24, 5012-5022; and "Compound prism design principles, III: linear-in-wavenumber and optical coherence tomography prisms," Applied Optics, 50, 25, 5023-5030, the design of dispersing prisms useful in these systems are described.

Drawbacks of current systems are the spatial aberrations introduced by reflective systems and expense of transmissive, e.g., Prism-Grating-Prism (PGP), systems. Light throughput of current systems inadequate.

Most coded aperture hyperspectral imaging systems have asymmetric relay systems, mostly dictated by axial chromatic aberration, or rely on gratings for dispersion, thereby greatly sacrificing light throughput.

It is an object of the invention to propose an optical relay system which is suited for relay of image or coded aperture, in particular adapted to correct for 'smile' and or 'keystone' distortions along a plane.

It is an object of the present disclosure to overcome or at least ameliorate the shortcomings associated with known shearing optical relay systems.

SUMMARY OF THE INVENTION

The present invention proposes a relay system according to claim 1, and an imaging device comprising such a relay system.

According to a first aspect of the present disclosure there is provided a spectrally shearing optical relay system, said relay system being comprised of two halves disposed symmetrically about an aperture stop S, wherein each half comprises a plurality of rotationally symmetric optical elements forming an objective and a compound prism comprised of a plurality of dispersing prisms. The compound prisms are located between the objectives and the aperture stop.

Such a relay system offers a bright aperture and improved image sharpness, which is of particular interest when used in an imaging device such as in a coded aperture spectral imager. Constraining the overall optical system to be nearly symmetric about the aperture stop reduces many aberrations to near zero.

The dispersing prisms are designed to simultaneously provide the required spectral shearing and allow the correction of optical aberrations created by the prisms to be corrected by rotationally symmetric optical components, thus providing a suitably spectrally sheared image with high sharpness.

In one aspect, the bundles of light incident on the compound prism are collimated. The advantage is that collimated bundles introduce negligible amounts of spherical aberration and coma into the design, which allows better correction of the overall design for sharpness.

In another aspect, at least one of the following conditions is met: the compound prisms show essentially zero deviation of the axial chief ray at the center wavelength, and the chief rays at the end points of the spectral range are deviated to spectrally shear the image.

In yet another aspect, at least one of the following conditions is met: the plurality of prisms forming the compound prisms have a small difference in refractive index at the center wavelength, in particular the difference in refractive index at the center wavelength is <0.001, and the plurality of prisms have a larger difference in refractive index at the end points of the spectral range, in particular the difference in refractive index between either end-point of the spectral range and the center wavelength is between 0.003 and 0.007.

The use of glasses with anomalous partial dispersion allows a high degree of chromatic aberration correction The external faces of the compound prisms can be perpendicular to the optical axis, preferably wherein external faces of the compound prisms are perpendicular to the optical axis within 0.1°. Constraining the geometry and materials of each prism in the system to appear as a nearly plane parallel plate with a constant index of refraction at the center wavelength allows a high degree of monochromatic aberration correction with rotationally symmetric optical components.

In one aspect, the objective is comprised of five rotationally symmetric lens elements, wherein a first and second lens elements form a first doublet, the third and fourth lens elements form a second doublet, the first and second doublets containing one glass with anomalous partial dispersion, and the fifth lens is a positive singlet.

The fifth lens can have a weak aspheric surface. Aspheric surfaces allow a brighter image.

The use of rotationally symmetric optical components reduces manufacturing costs.

In one embodiment, the relay optics system provides diffraction limited relaying over the 400-1000 nm range. The compound prisms are corrected for use between 400 nm and 1000 nm, and wherein the compound prisms are comprised of an exterior prism element and an interior prism element made from one of the following combinations:

Schott N-SK4 for the exterior prism element and Schott N-KzFS4 for the interior prism element or equivalent glasses from other manufacturers, Schott N-BAF51 for the exterior prism element and Schott N-KzFS5 for the interior prism element or equivalent glasses from other manufacturers, or Schott N-BK10 for the exterior prism element and Schott N-PK52A for the interior prism element or equivalent glasses from other manufacturers.

In yet a further aspect in which the system is designed for use between 400 nm and 1000 nm, two measures of refractive index dispersion can be defined as follows:

$$v700=(n700-1)/(n400-n700),$$

$$P700=(n400-n700)/(n400-n1000)$$

where $n400$, $n700$, and $n1000$ are the refractive indices at 400 nm, 700 nm, and 1000 nm, and the objective can satisfy the following expressions:

$-1.73<\Phi D1/\Phi objective<-1.57$
$0.92<\Phi D2/\Phi objective<1.01$
$0.89<\Phi L5/\Phi objective<0.98$
$n700$ for $L1>1.85$
$|\Delta P700/\Delta v700|<0.007$ for D1
$|\Delta P700/\Delta v700|<0.0001$ for D2
$v700$ for $L5>24$, where $\Phi objective$ is the optical power of the objective, $\Phi D1$ is the optical power of the first doublet (D1), $\Phi D2$ is the optical power of the second doublet (D2), $\Phi L5$ is the optical power of the singlet (L5), and $\Delta P700/\Delta v700$ for a doublet is the difference in $P700$ divided by the difference in $v700$ for the two glasses comprising the doublet.

The spectrally shearing relay system can be telecentric on both the object and image side.

In another embodiment, the relay optics system provides diffraction limited relaying over the short-wave infrared range, corrected for use between from 900-1700 nm. In this range, the compound prisms can be comprised of an exterior prism element and an interior prism element made Schott N-SF66 for the exterior prism element and Schott N-LASF31A for the interior prism element or equivalent glasses from other manufacturers.

The relay optics system allows a high sharpness, high brightness, spectrally shearing relay system that can be manufactured at relatively low cost. The relay optics system consists of custom designed lenses and prisms and includes on two (identical) aspherical surfaces, which avoids geometric distortions and lateral chromatic aberrations.

The present invention also proposes an imaging device comprising such an optical relay system as detailed above. Such an imaging device can be a tomographic imager or a coded aperture imaging device.

The features (including optional features) of any aspect may be combined with those of any other aspect, as appropriate.

BRIEF DESCRIPTION OF THE DRAWINGS

Example embodiments will be described, by way of example only, with reference to the drawings, in which:

FIG. 6 shows the distortion performance at multiple wavelengths with the device of FIGS. 2 and 3 according to an embodiment.

It should be noted that the Figures are diagrammatic and not drawn to scale. The same reference signs are generally used to refer to corresponding or similar feature in modified and different embodiments.

DETAILED DESCRIPTION OF THE INVENTION

Figure 1:
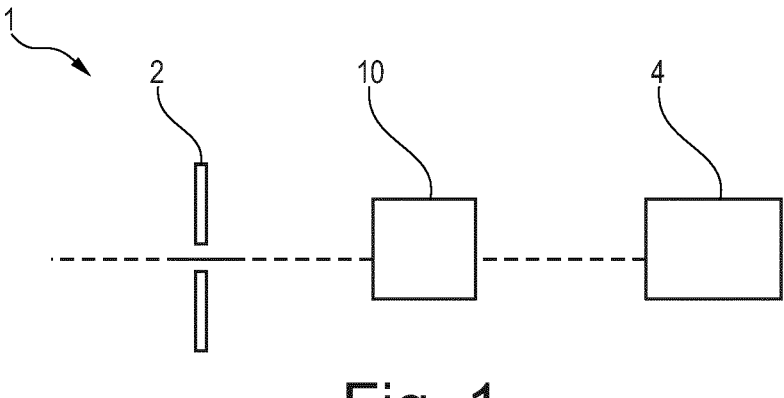
FIG. 1 is a schematic of an imaging device according to an embodiment.

FIG. 1 illustrates an imaging device 1 according to an embodiment.

The imaging device 1 may be a hyperspectral imaging device, with a coded aperture plate 2 forming an object to be relayed by an optical relay 10 to an image at a detector 4.

The optical relay 10 is adapted to spectrally shear the image in one orientation across the detector, said detector having a suitably wide spectral response to all the sheared wavelengths.

Figure 2:
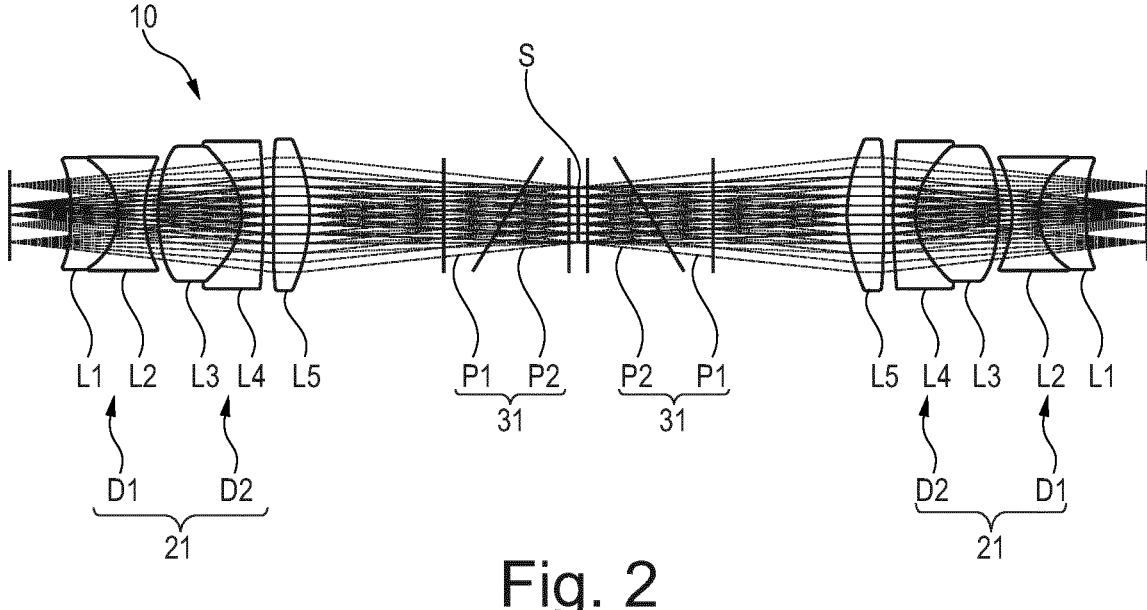
FIG. 2 is a schematic of a relay device according to an embodiment, in a plane of spectral shearing.
Figure 3:
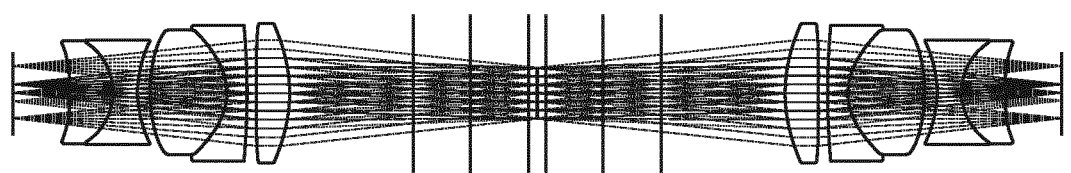
FIG. 3 is a schematic of the device of FIG. 2 according to an embodiment, in a plane of no spectral shearing.

The optical relay is an optical spectral shearing system and is illustrated in FIGS. 2 and 3.

FIG. 2 illustrates the optical spectral shearing relay system 10, in a plane of spectral shearing and FIG. 3 illustrates the optical spectral shearing relay system 10, in a plane of no spectral shearing, according to an embodiment of the invention, respectively The optical spectral shearing relay system 10 of FIGS. 2 and 3 comprises a plurality of compound prisms 31 and a plurality of rotationally symmetric lens elements L1, L2, L3, L4, and L5, each used twice, and disposed symmetrically about an aperture stop S.

With other words, the optical spectral shearing system 10 comprises two halves disposed symmetrically about the aperture stop S.

Each half is comprised of an objective 21 and a compound prism 31, whose designs are detailed hereafter:

The compound prism 31 is a cemented compound prism formed by an exterior prism element P1 on the objective side and an interior prism element P2 on the aperture stop side.

The exterior surfaces 22 of the compound prisms 31 are nearly perpendicular to the optical axis. Thus, at the center wavelength of the spectral band, the compound prisms look nearly like plane parallel plates formed of the same material disposed symmetrically about the stop.

In particular, the external prism surface on the exterior prism element P1 is tilted by less than 0.1° preferably less than 0.05° from perpendicular to the optical axis, which allows good correction of residual aberrations by rotationally symmetric optical elements elsewhere in the system.

Having more exterior prism surface tilt affects the aberration correction. For example, a combination of N-BAF51 and N-KzFS5 requires about twice as much exterior prism surface tilt, and this combination also yielded less dispersion. The combination of N-BK10 and N-PK52A has less exterior prism surface tilt but yields the lowest total dispersion.

The external prism surface of the interior prism element P2 is also tilted by less than 0.1 preferably less than 0.05° from perpendicular to the optical axis. Preferably, the external prism surface of the interior prism element P2 is perpendicular to the optical axis.

The symmetric disposition of lens elements, including plane parallel plates, about the stop automatically corrects coma, distortion, and lateral color in the optical system. Thus, at the center wavelength the optical system has negligible amount of coma and distortion.

The desired spectral shearing in one dimension is created by the dispersive action of the prism and is equivalent to lateral color in one dimension only. Rotationally symmetric lateral color contributed by other components of the design are small and insignificant with respect to the spectral shearing by the prism.

The remaining aberrations can be corrected by the rotationally symmetric lens elements using techniques well known in art of optical design and manufactured by traditional optical manufacturing methods.

In the embodiment of FIGS. 2 and 3, the compound prisms are designed so that there is essentially no deviation of the chief ray of the axial bundle at the center wavelength, and about deviation of the chief ray of the axial bundle between the short and long wavelengths.

The range and profile of the refractive indices determines the dispersion and linearity of dispersion that the prism provides to the optical system.

The compound prism 31 is comprised of a plurality of materials. The difference in the refractive index between the materials of the exterior prism element P1 and of the interior prism element P2 at the center wavelength of the spectral band is small between materials. The difference in refractive index grows with departure from the center wavelength of the spectral band. For example, a small difference in refractive index between the two prism materials is a difference of less than 0.001 at the center wavelength, and of between 0.003 and 0.007 at either end of the overall spectral range between 400 nm and 1000 nm.

Figure 8:
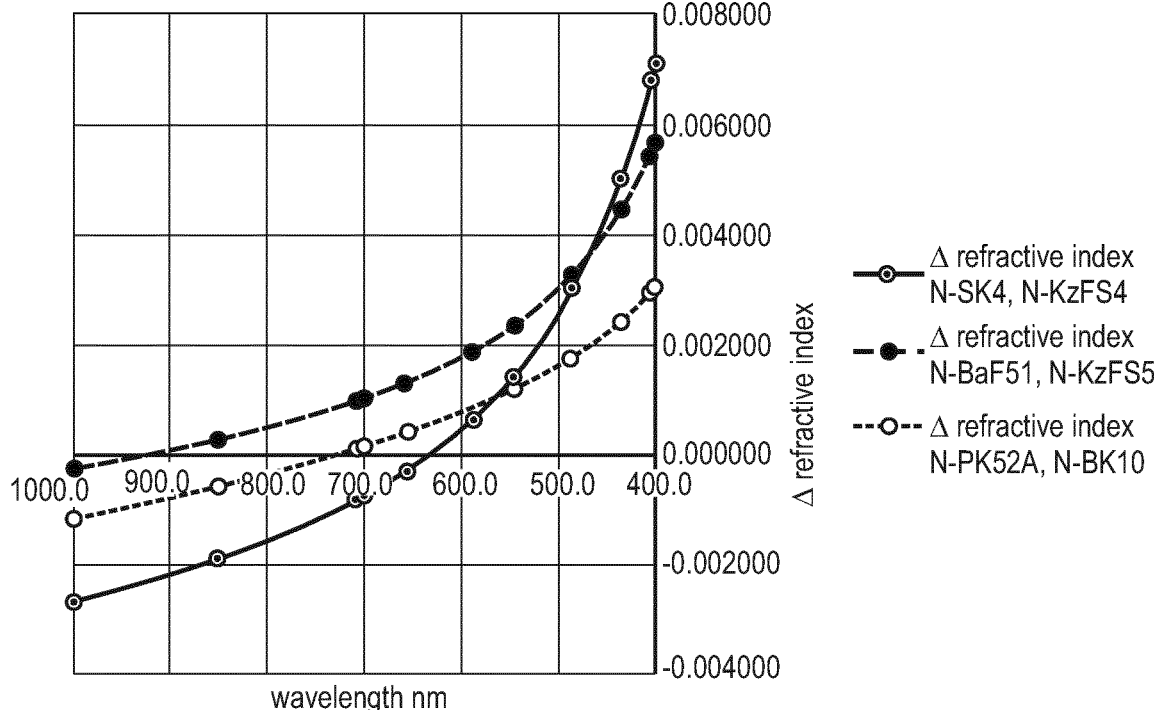
FIG. 8 shows refractive index properties of prism materials usable in a relay of FIGS. 2 and 3

In the embodiment of FIGS. 2 and 3, a small difference in refractive index between the exterior prism element P1 and the interior prism element P2 at the center wavelength was obtained by using Schott N-SK4 for P1 and Schott N-KzFS4 for P2. Equally good results are obtained by using Schott N-KZFS4 for P1 and Schott N-SK4 for P2. Other good Schott glass choices for similar compound prisms include N-BAF51+N-KzFS5, and N-BK10+N-PK52A. Glasses from other glass manufacturers with similar refractive index profiles between 400 and 1000 nm can also be used with good results as is well known to those skilled in the art of optical design. FIG. 8 summarizes some refractive index properties of these materials. These combinations all show small differences in index of refraction at the center wavelength of 700 nm, preferably less than 0.001.

The combination of N-Sk4 and N-KzFS4 were found to be a good choice for meeting the design criteria of the compound prisms spectral range between 400 nm and 1000 nm.

This prism glass combination of N-Sk4 and N-KzFS4 also give the most dispersion and therefore the largest number of spectral channels for a fixed optical system length. The difference in refractive indices over the spectral range (between 0.003 and 0.007 at either end of the overall spectral range between 400 nm and 1000 nm) between the two glasses was also small enough to keep the prism looking enough like a plane parallel plate to allow good aberration correction by rotationally symmetric optical elements elsewhere in the system The internal prism angle between the exterior prism element P1 and the interior prism element P2 can be small enough to keep the overall prism size reasonably compact. A small angle can be defined to be within 60 degrees from the P1/P2 surfaces being perpendicular. Any larger the prism becomes a lot longer than it is tall, leading to a large addition to the optical path length.

Figures 4, 5:
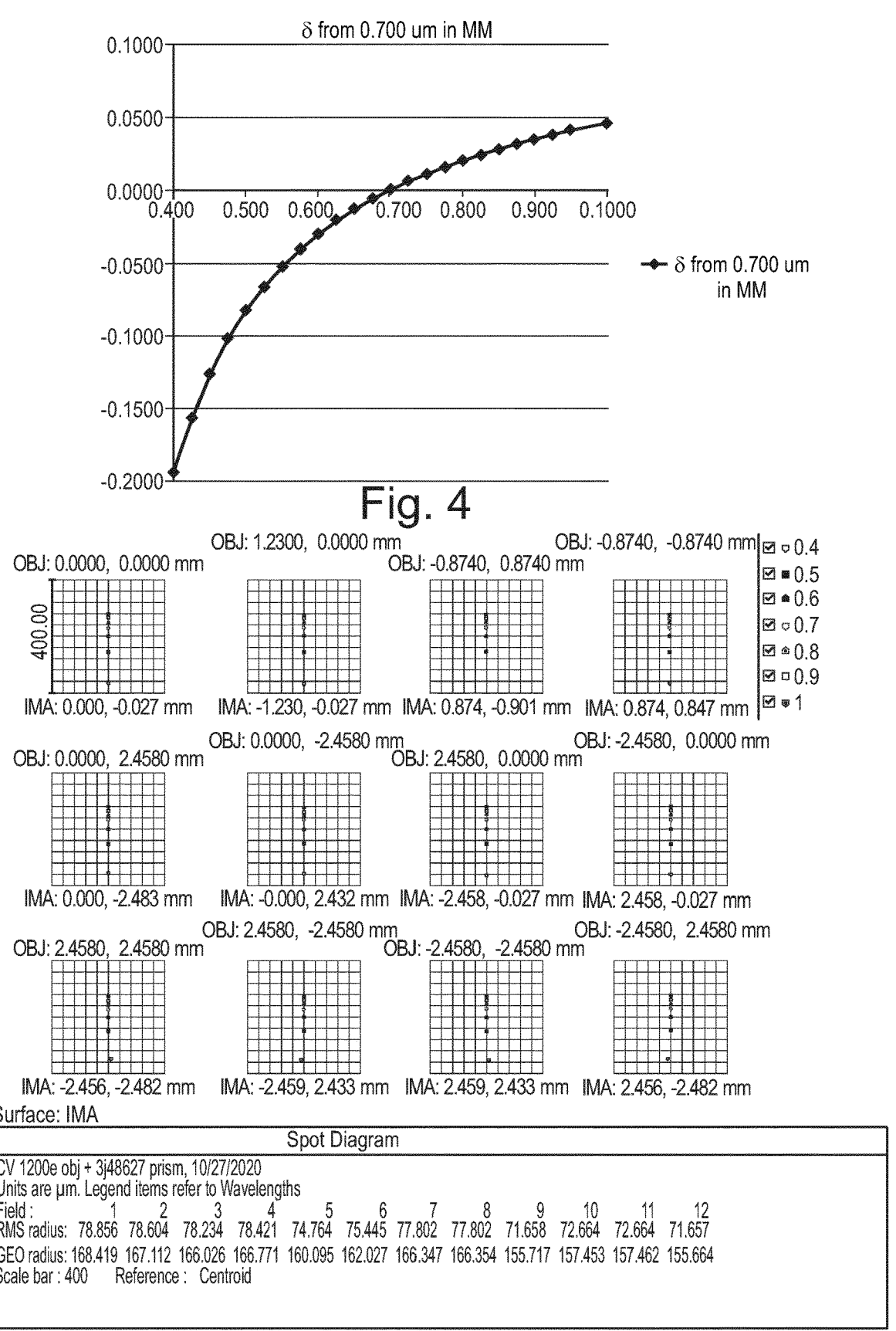
FIG. 4 is a diagram of dispersion in shearing direction for an axial object point in the device of FIGS. 2 and 3 according to an embodiment.
FIG. 5 is a spot diagram at multiple wavelengths showing the effects of residual lateral color on the spectral shearing with the device of FIGS. 2 and 3 according to an embodiment.
Figure 7A:
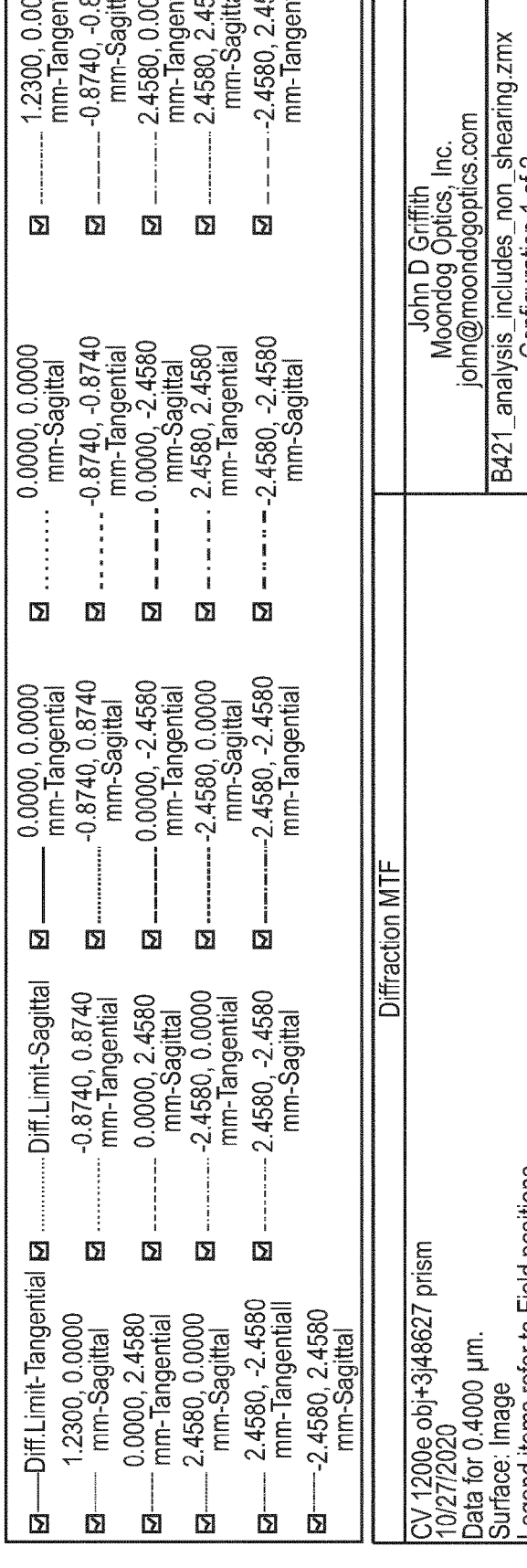
FIGS. 7A-7D show the sharpness performance at multiple wavelengths as MTF (Modulation Transfer Function) in the device of FIGS. 2 and 3.
Figure 7B:
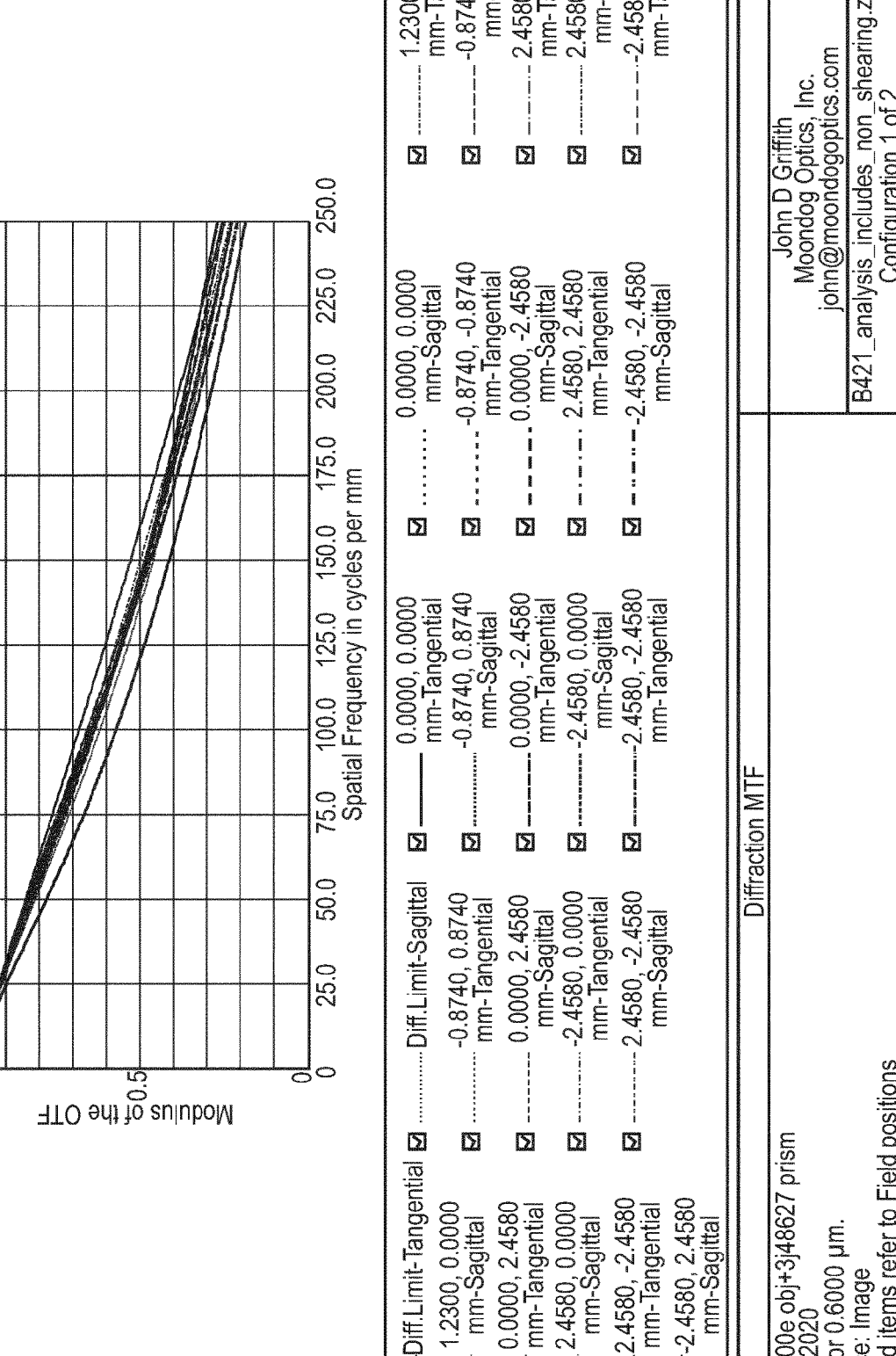
Figure 7C:
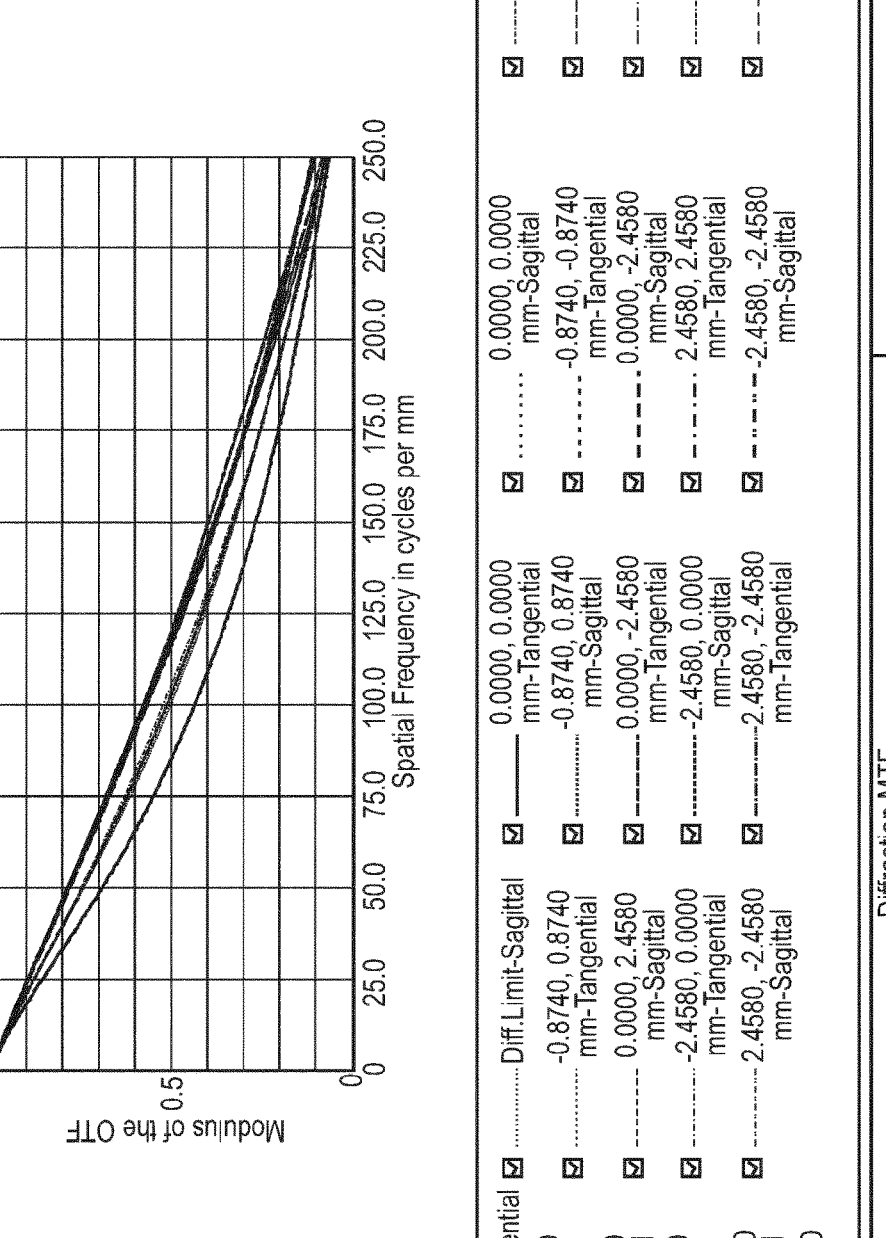
Figure 7D:
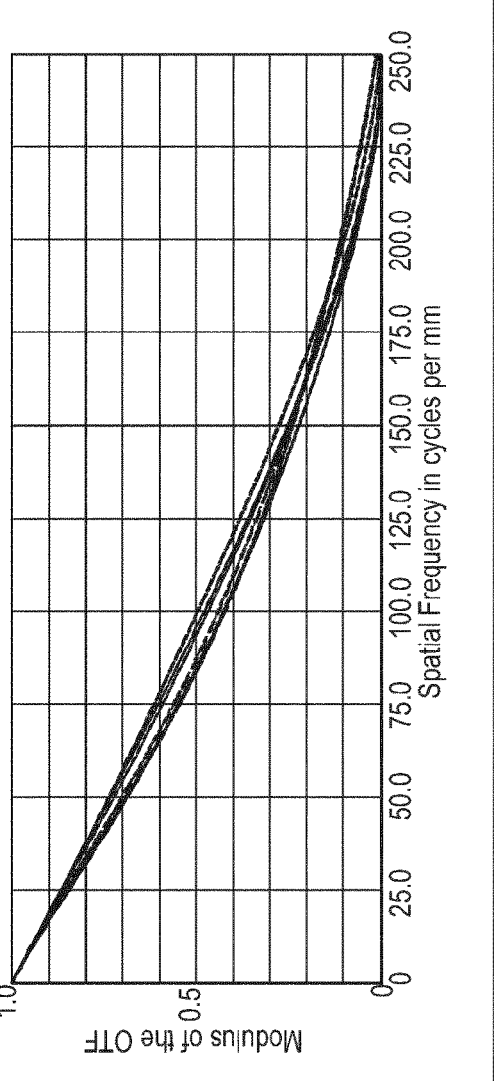

The embodiment of FIGS. 2 and 3 operates between 400 nm and 1000 nm. The dispersion in the shearing direction is 240 um, which allows 50 spectral channels using detection elements 4.8 um×4.8 um at the detector. It operates with an effect f-number of f/4.2 over an object side field of view of 4.92×4.92 mm. FIG. 4 shows the dispersion at the image in the shearing direction for the axial object point. FIG. 5 is a spot diagram at multiple wavelengths showing the effects of residual lateral color on the spectral shearing. FIG. 6 shows the distortion performance at multiple wavelengths.

FIGS. 7A-7D show the sharpness performance at multiple wavelengths as MTF (Modulation Transfer Function) and includes diffraction limited performance for comparison. In addition to sharpness, the high MTF minimizes spectral crosstalk between detector elements. The combination of the spectral shearing performance, low distortion, and high MTF allows the subsequent signal processing to extract high quality hyperspectral images.

In an embodiment, a relay system is also proposed that operates in the short wavelength infra-red range, from 900-1700 nm. In this operating range, the prism compound is preferably made of Schott N-SF66 for the exterior prism element and Schott N-LASF31A for the interior prism element or equivalent glasses from other manufacturers. It should be noted that, in this operating SWIR range, the required dispersion demands very high angles between the two glasses of the compound prism, which makes the exterior and interior prisms longer. The internal transmittance of the prisms at these lengths is driving the low overall system transmittance. The transmittance cannot be improved by coatings.

Prior art relay systems between coded aperture plates and detectors shown in prior art do not have exterior prism surfaces nearly perpendicular to the optical axis, prism element index matching at the center wavelength of the spectral band, or utilize the symmetric principle of optical design. The present system invention offers improvements in aperture, field of view, and sharpness over prior art.

The objectives 21 are comprised of five of rotationally symmetric lens elements L1, L2, L3, L4, and L5. The objective 21 comprises a negative doublet D1, made of first and second lens elements L1 and L2, a positive doublet D2, made of third and fourth lens elements L3 and L4, and the fifth lens element L5 is the positive singlet.

The positive singlet has a surface facing the prism which can be aspherical. Aspheric surfaces allow a brighter image, helping for correcting for spherical aberrations. In addition, it reduces the relay system size.

It should be noted that aspheric surfaces for the singlet element are preferred for the range of 400-900 nm, and is optional for the range of 900 to 1700 nm.

Cementing the first and second lens elements L1 and L2, and the third and fourth lens elements L3 and L4 to form doublets allows avoiding tight tolerances and reduces the number of air-glass interfaces for AR coating.

Each doublet D1, D2, is containing one glass with anomalous partial dispersion.

The objective 21 delivers collimated bundles of light to the prisms 31 from the various field points. The advantage is that the collimated bundles introduce negligible amounts of spherical aberration and coma into the design, which allows better correction of the overall design for sharpness. Indeed, placing the prisms in a converging beam in either the object or image space as is shown in some prior art introduces spherical aberration and coma into the image. Correcting these aberrations to achieve a sharpness equivalent to the embodiment shown in FIGS. 2 and 3 would otherwise requires a significantly more complex and costly optical design. Not correcting them degrades the sharpness.

Further, the aperture stop S is located with respect to the cardinal points of the objective 21 to provide a nearly telecentric system in both object and image spaces. The advantage of the double telecentricity is that, when used in a CASSI system such as the hyperspectral imaging device 1, the magnification of the optical system spectral shearing system 1 is insensitive to longitudinal shifts of either the coded aperture plate 2 or the detector 3. This is an aid to assembly and calibration of the overall system.

It should be noted that the window in the image space does not significantly affect the symmetry as it can be replaced by an air equivalent thickness.

The symmetric disposition of lens elements, including plane parallel plates, about the stop automatically corrects coma, distortion, and lateral color in the optical system. Thus, at the center wavelength the optical system has negligible amount of coma and distortion.

The use of rotationally symmetric optical components reduces manufacturing costs.

Correction of the chromatic aberrations over a wide wavelength range of 400 nm to 1000 nm can be obtained when the design of the objective 21 meets certain conditions. Two measures of refractive index dispersion are defined as follows:

$$v_{700} = (n_{700}-1)/(n_{400}-n_{700}),$$

$$P_{700} = (n_{400}-n_{700})/(n_{400}-n_{1000})$$

where $n_{400}$, $n_{700}$, and $n_{1000}$ are the refractive indices at 400 nm, 700 nm, and 1000 nm.

Good solutions for the relay system are found under the following conditions, where $\Phi_{objective}$ is the optical power of the objective comprised of the first doublet D1, the second doublet D2, and the singlet L5 and $\Phi_{D1}$ is the optical power of the first doublet D1, $\Phi_{D2}$ is the optical power of the second doublet D1, $\Phi_{L5}$ is the optical power of the singlet L5, and $\Delta P_{700}/\Delta v_{700}$ for a doublet is the difference in $P_{700}$ divided by the difference in $v_{700}$ for the two glasses comprising the doublet:

$-1.73 < /\Phi_{objective} < -1.57$ $0.92 < \Phi_{D2}/\Phi_{objective} < 1.01$ $0.89 < \Phi_{L5}/\Phi_{objective} < 0.98$ $n_{700}$ for L1 > 1.85

$|\Delta P_{700}/\Delta v_{700}| < 0.007$ for D1

$|\Delta P_{700}/\Delta v_{700}| < 0.0001$ for D2

$v_{700}$ for L5 > 24

Lens L5 has a weak aspheric surface to help correct spherical aberration. Relays that have slower numerical apertures or lower sharpness requirements do not need this aspheric surface.

In summary, for a system operating between 400 and 1000 nm, the objective preferably comprises the following glasses: Schott N-LASF46B for the first lens element L1, Schott N-KZFS4 for the second lens element or equivalent glasses from other manufacturers for the first doublet, Schott N-PK51 for the third lens element L3 and Schott N-KZFS11 for the fourth lens element L4 or equivalent glasses from other manufacturers for the second doublet D2, Schott N-PK51 or equivalent glasses from other manufacturers for the fifth lens element L5.

The prism combination for a system operating between 400 and 1000 nm is preferably chosen among one of the following combinations: Schott N-SK4 for the exterior prism element and Schott N-KzFS4 for the interior prism element or equivalent glasses from other manufacturers, Schott N-BAF51 for the exterior prism element and Schott N-KzFS5 for the interior prism element or equivalent glasses from other manufacturers, and Schott N-BK10 for the exterior prism element and Schott N-PK52A for the interior prism element or equivalent glasses from other manufacturers.

In summary, a spectrally shearing relay system can have the following optical prescription: L1: N-LASF46B, L2: N-KZFS4, L3:N-PK51, L4: N-KZFS11, L5 N-PK51, equivalent glasses and one of the above-mentioned prism combination.

The relay design operating between 400 and 1000 nm is compact, with a distance between the object and the image of 99 mm.

In another embodiment, the alternative relay system is designed to operate in the Short Infra red system, from 900 to 1700 nm, with a distance between the object and the image of about 277 mm. Indeed, in this range, the required dispersion demands very high angles between the two glasses of the compound prism, which makes the exterior and interior prisms longer.

For a relay system that operates from 900 to 1700 nm, the objective preferably comprises the following glasses: Schott N-LASF31A for the first lens element L1 and Schott N-KZFS4 for the second lens element L2 (Doublet 1), Schott N-FK51A for the third lens element L3 and Schott N-KZFS11 for the fourth lens element L4 (Doublet 2), and Schott N-FK51A for the fifth lens element L5 (Singlet). The prism compound is preferably made of Schott N-SF66 for the exterior prism element and Schott N-LASF31A for the interior prism element or equivalent glasses from other manufacturers.

In summary, the present invention proposes a shearing optical system comprising rotationally symmetric lens elements and compound prisms which form an image that is both sharp and spectrally sheared in one direction. It operates a unit magnification and the double telecentricity makes the magnification insensitive to longitudinal shifts of the object or image during assembly. The effect of the window on the overall performance is insignificant. This is an aid to assembly and calibration of the overall system.

Additional reference materials include the following:

Wagadarikar, John, Willet, and Brady, "Single disperser design for coded aperture snapshot", Applied Optics, 47, 10, B44-B51 (2008);

Kittle, Cho, Wagadarikar, and Brady, "Multiframe image estimation for coded aperture snapshot spectral imagers", Applied Optics, 49, 36, 6824-6833 (2010);

Kester, Bedard, Gao, Tkacyzk, "Real-time snapshot hyperspectral imaging endoscope", Journal of Bio-medical Optics, 16, 5, 056005-1-12 (2011); and
Arce, Brady, Carin, Arguello, Kittle, Compressive Coded Aperture Spectral Imaging, IEEE Signal Processing Magazine, 105-115 (2014).

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto and their equivalents. The entirety of each of the afore-mentioned documents is incorporated by reference herein.

The invention claimed is:

1. A spectrally shearing optical relay system, said optical relay system being comprised of two halves disposed symmetrically about an aperture stop, wherein each one of the two halves comprises a plurality of rotationally symmetric optical elements forming an objective and a compound prism comprised of a plurality of dispersing prisms, wherein the compound prisms are located between the objectives and the aperture stop, wherein at least one of the following conditions is met:

the plurality of prisms forming the compound prisms have a small difference in refractive index at the center wavelength, and the plurality of prisms has a larger difference in refractive index at the end points of the spectral range, and wherein two measures of refractive index dispersion are defined as follows:

$$v700=(n700-1)/(n400-n700),$$

$$P700=(n400-n700)/(n400-n1000)$$

where $n400$, $n700$, and $n1000$ are the refractive indices at 400 nm, 700 nm, and 1000 nm, and wherein the objective is comprised of five rotationally symmetric lens elements (L1, L2, L3, L4, L5), wherein a first lens element and a second lens element (L1, L2) form a first doublet (D1), a third lens element and a fourth lens element (L3, L4) form a second doublet (D2), and a fifth lens element is a positive singlet, the objective satisfying the following expressions:

$1.73<\Phi_{D1}/\Phi_{objective}<-1.57$ $0.92<\Phi_{D2}/\Phi_{objective}<1.01$ $0.89<\Phi_{L5}/\Phi_{objective}<0.98$ $n_{700}$ for L1>1.85

$|\Delta P_{700}/\Delta v_{700}|<0.007$ for D1

$|\Delta P_{700}/\Delta v_{700}|<0.0001$ for D2

$v_{700}$ for L5>24, where $\Phi_{objective}$ is the optical power of the objective, $\Phi_{D1}$ is the optical power of the first doublet (D1), $\Phi_{D2}$ is the optical power of the second doublet (D2), $\Phi_{L5}$ is the optical power of the singlet (L5), and $\Delta P_{700}/\Delta v_{700}$ for a doublet is the difference in $P_{700}$ divided by the difference in $v_{700}$ for the two glasses comprising the doublet.

2. The spectrally shearing optical relay system according to claim 1, where the bundles of light incident on the compound prism are collimated.

3. The spectrally shearing optical relay system according to claim 1, where at least one of the following conditions is met:

the compound prisms show essentially zero deviation of the axial chief ray at the center wavelength, and the chief rays at the end points of the spectral range are deviated to spectrally shear the image.

4. The spectrally shearing optical relay system according to claim 1, wherein the difference in refractive index at the center wavelength is <0.001.

5. The spectrally shearing optical relay system according to claim 4, wherein the difference in refractive index between either endpoint of the spectral range and the center wavelength is between 0.003 and 0.007.

6. The spectrally shearing optical relay system according to claim 1, wherein the external faces of the compound prisms are perpendicular to the optical axis.

7. The spectrally shearing optical relay system according to claim 6, wherein the external faces of the compound prisms are substantially perpendicular to the optical axis to within 0.1°.

8. The spectrally shearing optical relay system according to claim 1, wherein the first and second doublets (D1, D2) comprise one glass with anomalous partial dispersion.

9. The spectrally shearing optical relay system according to claim 8, wherein the fifth lens element has a weak aspheric surface.

10. The spectrally shearing optical relay system according to claim 1, wherein the compound prisms are corrected for use between 400 nm and 1000 nm, and wherein the compound prisms are comprised of an exterior prism element and an interior prism element made from one of the following combinations:

Schott N-SK4 for the exterior prism element and Schott N-KzFS4 for the interior prism element or equivalent glasses from other manufacturers, Schott N-BAF51 for the exterior prism element and Schott N-KzFS5 for the interior prism element or equivalent glasses from other manufacturers, or Schott N-BK10 for the exterior prism element and Schott N-PK52A for the interior prism element or equivalent glasses from other manufacturers.

11. The spectrally shearing relay system according to claim 1, wherein the spectrally shearing relay system is telecentric on an object side and an image side.

12. The spectrally shearing optical relay system according to claim 1 being corrected for use between from 900-1700 nm.

13. The spectrally shearing optical relay system according to claim 12, wherein the compound prisms are comprised of an exterior prism element and an interior prism element made Schott N-SF66 for the exterior prism element and Schott N-LASF31A for the interior prism element or equivalent glasses from other manufacturers.

14. An imaging device comprising an optical relay system, wherein the optical relay system comprises two halves disposed symmetrically about an aperture stop, wherein each one of the two halves comprises a plurality of rotationally symmetric optical elements forming an objective and a compound prism comprised of a plurality of dispersing prisms, and wherein the compound prisms are located between the objectives and the aperture stop, wherein at least one of the following conditions is met:

the plurality of prisms forming the compound prisms have a small difference in refractive index at the center wavelength, in particular the difference in refractive index at the center wavelength is <0.001, and the plurality of prisms has a larger difference in refractive index at the end points of the spectral range, and wherein two measures of refractive index dispersion are defined as follows:

$$v700=(n700-1)/(n400-n700),$$

$$P700=(n400-n700)/(n400-n1000)$$

where n400, n700, and n1000 are the refractive indices at 400 nm, 700 nm, and 1000 nm, and wherein the objective is comprised of five rotationally symmetric lens elements (L1, L2, L3, L4, L5), wherein a first lens element and a second lens element (L1, L2) form a first doublet (D1), a third lens element and a fourth lens element (L3, L4) form a second doublet (D2), and a fifth lens element is a positive singlet, wherein the objective satisfies the following expressions:

$-1.73<\Phi_{D1}/\Phi_{objective}<-1.57$ $0.92<\Phi_{D2}/\Phi_{objective}<1.01$ $0.89<\Phi_{L5}/\Phi_{objective}<0.98$ $n_{700}$ for L1>1.85

$|\Delta P_{700}/\Delta v_{700}|<0.007$ for D1

$|\Delta P_{700}/\Delta v_{700}|<0.0001$ for D2

$v_{700}$ for L5>24, where $\Phi_{objective}$ is the optical power of the objective, $\Phi_{D1}$ is the optical power of the first doublet (D1), $\Phi_{D2}$ is the optical power of the second doublet (D2), $\Phi_{L5}$ is the optical power of the singlet (L5), and $\Delta P_{700}/\Delta v_{700}$ for a doublet is the difference in $P_{700}$ divided by the difference in $v_{700}$ for the two glasses comprising the doublet.

* * * * *